April 9, 1968   A. B. MENZER   3,377,228
METHOD OF MANUFACTURING A STRUCTURAL PANEL
Filed Oct. 23, 1964

*INVENTOR:*
ALFRED B. MENZER
BY
*Carl C. Batz*
ATT'Y

United States Patent Office 3,377,228
Patented Apr. 9, 1968

3,377,228
METHOD OF MANUFACTURING A
STRUCTURAL PANEL
Alfred B. Menzer, Joliet, Ill., assignor to Kemlite Corporation, Joliet, Ill., a corporation of Illinois
Continuation-in-part of application Ser. No. 268,866, Mar. 29, 1963, now Patent No. 3,226,150. This application Oct. 23, 1964, Ser. No. 405,954
11 Claims. (Cl. 156—301)

ABSTRACT OF THE DISCLOSURE

A process for making a structural panel by which a fiber glass mat is passed through a bath of thermosetting resin to impregnate the sheet with resin, and the impregnated sheet passed between a rigid base sheet such as plywood and a cellulose sheet through the opening between a pair of squeeze rolls, and heat is applied through the cellulose sheet to the impreganted fiber glass sheet to cure the resin. Additional features of the invention are the application of heat to the base sheet prior to contacting the same with the impregnated mat, and the application of thermosetting resin to the plywood sheet, preferably by spraying, prior to contacting the same with the impregnated mat.

This application is a continuation-in-part of my application Ser. No. 268,866, filed Mar. 29, 1963, now U.S. Patent No. 3,226,150. This invention relates to a panel for use in construction such as the lining of refrigerator compartments and for other purposes. More especially the invention relates to special and improved methods for constructing such a panel.

An object of the invention is to provide such a panel which has a smooth, tough, surface, resistant to abrasion or damage, and which at the same time is rigid and can accept a heavy blow without damage. A further object is to provide such a panel utilizing plywood as a basic element.

Another object is to provide a method of fabrication whereby the above-described panel can be produced in a practial, effective way.

Figure 1:
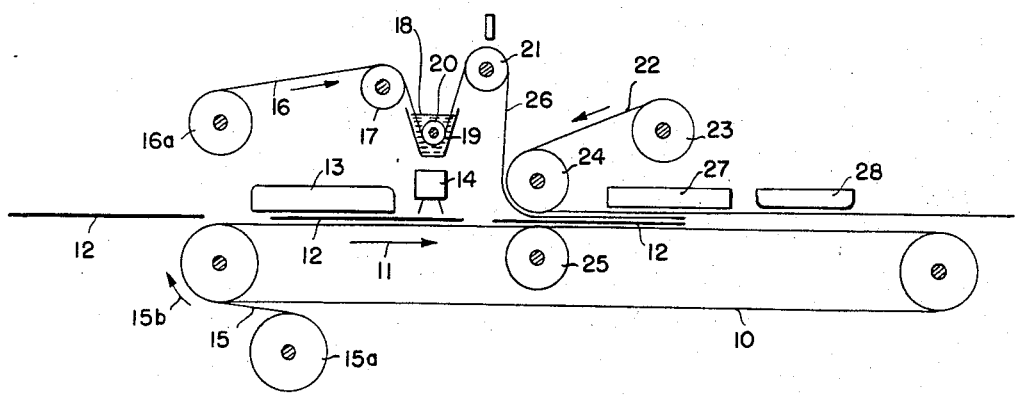
Figure 2:
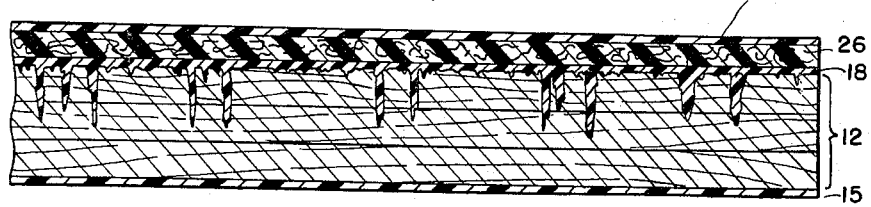

The invention is illustrated in the accompanying drawing in which:

FIG. 1 is a schematic view illustrating the manufacture of the improved panel; and FIG. 2 is an enlarged fragmentary cross sectional view of the improved panel.

My improved procedure for manufacture of the coated rigid sheet panel is illustrated in FIG. 1 of the drawing. Referring to FIG. 1, the character 10 designates a conveyor which is driven in the direction of arrow 11, so that articles resulting thereon are passed from left to right. The character 12 designates sheets of plywood which are consecutively placed on the conveyor at the left and are passed through the action of the conveyor toward the right. In such passage the plywood sheets pass first under the shoe 13. Shoe 13 is heated as by an electrical heating element and as the sheets pass thereunder their top surfaces are warmed. As the sheets pass forwardly they next come under the spray heads 14 which are connected with a source of thermosetting resin under pressure and which are positioned so as to spray downwardly against the heated surface of the sheets giving the sheets a preliminary coat of resin.

I prefer to use plywood as the base of starting sheet, but may also use solid wood board or other rigid sheet material. Further, I prefer to place on the conveyor a sheet of cellulose film so that the sheets of plywood rest on this film. In FIG. 1 the cellulose film 15 from roll 15a is shown as drawn in direction of arrow 15b over the conveyor, and the sheets 12 rest on this film as they pass forwardly on the conveyor.

Glass fiber mat 16 is drawn from roll 16a, passed over roll 17 and down into a pool of thermosetting resin 18 contained within the trough 19, passed under the roll 20, and thence upwardly out of the resin pool, over the roll 21, and then down onto the top surface of the plywood sheets 12.

A sheet of cellulose film 22 is drawn from the roll 23, passed around roll 24 and on the top side of the resin impregnated mat 26 as the assembly of plywood 12 with cellulose film 15 on its under side and resin impregnated glass fibers 26 on its top side and cellulose film 22 on top of the resin impregnated film, passes between the squeeze rolls 24 and 25. The squeeze rolls have the function of pressing the layers of this assembly firmly together and squeezing out any air bubbles that may have been entrapped in the resin or between the cellulose films and the other layers of the structure. Another function of the squeeze rolls is to bring the assembly to uniform thickness and leveling out any accumulation or unevenness of the resin.

As the assembly passes along on the conveyor it passes under the shoe 27 which is heated as by an electric current and which imparts heat through the cellulose film 22 to start the cure of the resin, and then passes on under a second shoe 28 which, like shoe 27, also imparts heat through the film 22. The heating elements may be of such number and so spaced that by the time the assembly has passed through all these elements the resin has been fully and finally set. As the cured sheets pass from the conveyor the resin impregnated glass fibers and the cellulose films are cut between panels, and the edges of the panel are trimmed to present a neat appearance. The panels may be shipped in this form with the cellulose films protecting them on both sides and these films stripped off when the panel is about to be used.

The thermosetting resin which is sprayed onto the top of the board at 14, and also the thermosetting resin which is placed in the trough 19 may be any thermosetting resin such as polyester, acrylic, acrylic modified polyester, epoxy resin, or the like. Preferably I use polyester resin with a minor amount of styrene, and preferably I include in the resin dispensed by trough 19 a white or colored pigment which gives a good appearance to the face side of the panel.

Preferably the protective film 22 is removed before the panel is utilized, but such removal is not esential; and also the back film 15 may be removed before the panel is utilized, but this removal is of still less importance.

I believe that the improved characteristics of my product are in part due to the tight bond which is obtained between laminations. The resin coating, which is applied as by spraying at 14, flows into the irregularities of the top surface of the plywood so as to secure a tight relationship with that surface, and then when the resin impregnated glass fiber sheet is applied on top of this resin layer the resin which was previously applied merges with the resin of the impregnated glass fiber sheet top for a tight bond with the glass fibers. FIG. 2 of the drawings shows, in a somewhat exaggerated way, how the resin applied at 14 fills the crevices 32 in the top of the plywood layer.

While the foregoing detailed description and explanation has been concerned with certain specific embodiments of the invention, it is understood that the invention may take many forms which may vary widely, all within the spirit and scope of the following claims.

I claim:

1. A process for making a structural panel comprising passing a mat of fiber glass through a bath of thermosetting resin, passing the resin impregnated fiber glass so formed between a sheet of plywood and a sheet of cellulose film through the opening between a pair of squeeze rolls to squeeze air and surplus resin from said fiber glass mat and put the resin into contact with all parts of the surface of said plywood sheet, and applying heat through said cellulose films to said resin impreganted fiber glass to cure the same.

2. A process as set forth in claim 1 including heating the surface of said plywood sheet before the resin impregnated fiber glass mat is brought into contact with said surface.

3. A process as set forth in claim 1 including the step of applying a coating of thermosetting resin to the surface of the plywood sheet prior to placing the resin impregnated fiber glass mat on such surface.

4. A process as set forth in claim 1 which includes the step of passing the assembly including the plywood sheet the resin impregnated mat and the cellulose sheet, under heated shoes whereby heat is transmitted through said cellulose sheet to the resin within said fiber glass mat and on the surface of the plywood sheet so as to cure said resin.

5. A process for making a structural panel comprising heating the surface of a rigid base sheet, applying liquid thermosetting resin to the heated surface so prepared, passing a mat of glass fibers through a bath of thermosetting resin, passing the resin impregnated glass fiber mat so formed between the resin coated surface of said base sheet and a sheet of cellulose film through the opening between a pair of squeeze rolls to squeeze air and surplus resin from said glass fiber mat, and applying heat to the resin of said surface and the resin of said mat, to cure the same.

6. A process as set forth in claim 5 wherein the resin is applied to the surface of said base sheet by spraying the resin onto said sheet.

7. A process as set forth in claim 5 wherein said heat is applied through said cellulose sheet.

8. A process for making a structural panel comprising applying liquid thermosetting resin to the surface of a rigid base sheet, passing a mat of glass fibers through a bath of thermosetting resin, passing the resin impregnated glas fiber mat so formed between the resin coated surface of said base sheet and a sheet of cellulose film through the opening between a pair of squeeze rolls to squeeze air and surplus resin from said glass fiber mat, and applying heat to the resin of said surface and the resin of said mat, to cure the same.

9. A process as set forth in claim 8 wherein the resin is applied to the surface of said base sheet by spraying.

10. A process as set forth in claim 8 wherein said base sheet is a plywood sheet.

11. A process as set forth in claim 1, in which said resin impregnated fiber glass sheet and said cellulose sheet are in continuous strips and said plywood is in discontinuous lengths, and including the step of severing said resin impregnated sheet between the lengths of said plywood after the same has been cured.

References Cited

UNITED STATES PATENTS

| | | | |
|---|---|---|---|
| 2,089,034 | 8/1937 | Nevin | 156—313 |
| 2,782,458 | 2/1957 | Emmert et al. | 156—323 X |
| 2,875,117 | 2/1959 | Potchen et al. | 156—323 X |
| 2,991,214 | 7/1961 | Burkholder | 156—301 |
| 3,143,454 | 8/1964 | Hannon | 156—301 X |

EARL M. BERGERT, *Primary Examiner.*

HAROLD ANSHER, *Examiner.*

UNITED STATES PATENT OFFICE
CERTIFICATE OF CORRECTION

Patent No. 3,377,228                  April 9, 1968

Alfred B. Menzer

It is certified that error appears in the above identified patent and that said Letters Patent are hereby corrected as shown below:

Column 1, line 43, "practial" should read -- practical --; line 54, "resulting" should read -- resting --; line 67, "of" should read -- or --. Column 2, line 61, "top for" should read -- to form --. Column 3, line 7, "films" should read -- film --.

Signed and sealed this 29th day of July 1969.

(SEAL)
Attest:

Edward M. Fletcher, Jr.
Attesting Officer

WILLIAM E. SCHUYLER, JR.
Commissioner of Patents